Patented Nov. 10, 1953

2,658,873

UNITED STATES PATENT OFFICE 2,658,873

GERMICIDAL DETERGENT COMPOSITION

Melvin Wayne Marcoux, Chicago, Ill. assignor to Armour and Company, Chicago, Ill., a corporation of Illinois No Drawing. Application May 21, 1947
Serial No. 749,603

3 Claims. (Cl. 252—106)

This invention relates to a germicidal detergent, and one that is particularly useful in dairy plant sterilization where large amounts of fat have to be emulsified and removed.

In dairy plant practice, it is necessary to clean at frequent intervals large vats and intricate pipe lines and to sterilize them. Ordinarily, such systems are cleaned with trisodium phosphate, together with other detergents, and finally sterilization is accomplished by chlorination or other means. None of the above will accomplish both cleaning and sterilization in a single operation. In the best practice it has been customary to employ at least three detergents as primary cleaning agents, and then finally there is a separate flush of the same equipment with a chlorine sterilizing agent. These separate operations are expensive in time and materials and are unpleasant operations to be carried on by the limited labor force available. There is an urgent need for a germicidal detergent which will operate with soft or hard water and which will effect the removal of fats and other foreign materials while simultaneously sterilizing the equipment.

An object of the present invention is to satisfy the above need and to provide a germicidal detergent which is effective in both cleaning and bringing about the desired bactericidal effect. Yet another object is to provide a germicidal detergent effective with hard and soft water for the removal of fat, etc., in dairy plants and the like, while at the same time sterilizing the equipment. Yet another object is to provide a water-soluble germicidal detergent which may be used effectively with hard or soft water and without the addition of any other ingredients for the cleaning and sterilizing of plant and other equipment. Other specific objects and advantages will appear as the specification proceeds.

Trisodium phosphate is commonly used in dairy plant practice because of its effect in emulsifying fats. A polyphosphate or a polymerized phosphate salt having more than one phosphorous atom is commonly employed to soften the water and to keep the trisodium phosphate from forming a precipitate with hard water.

Quaternary ammonium compounds are known to have germicidal activity and are desirable as wetting agents. A combination, however, of the above materials with quaternary ammonium compounds is not effective as a germicidal detergent. The polyphosphate is not compatible with the quaternary ammonium compounds used and produces a precipitate. The precipitate defeats the purpose of producing a water-soluble germicidal detergent.

The addition of alkalies, such as sodium hydroxide, does not modify the above adverse effect. Potassium phosphate and sodium phosphate also fail to change the above undesirable result. I have discovered, however, that by using a polyphosphate which is a pyrophosphate the use of sodium carbonate restores the effectiveness of the composition as a detergent, prevents the precipitation described, and restores the complete effectiveness of the quaternary ammonium compound as a germicide. Why sodium carbonate should bring about this result is difficult to understand. Sodium carbonate is used extensively as a filler for detergents. It is not used as an enhancing agent of the detergent but, rather, as a bulking agent. Why such a bulking agent in the present composition should reverse the results normally brought about by the addition of a pyrophosphate and trisodium phosphate to a quaternary ammonium compound is not understood.

By the addition of sodium carbonate to the above composition, a combination is obtained which is water-soluble and which becomes immediately effective as a germicidal detergent upon the addition of hard or soft water. Further, while the germicidal activity of a quaternary ammonium compound is reduced when the same is combined with soap, in the present compound, which has high detergent value, there is no reduction in the germicidal activity of the quarternary ammonium compound. The new combination comprises:

(1) Aliphatic quaternary ammonium compound
(2) Sodium carbonate
(3) Trisodium phosphate
(4) Pyrophosphate Any water-soluble aliphatic quaternary ammonium compound known to have germicidal value may be employed. The group of such compounds is well known. For example, aliphatic quaternary ammonium halides or sulphates are very satisfactory. A compound of the general formula

in which X represents a sulphate or halogen radical and in which $R'$, $R^2$ and $R^3$ are aliphatic radicals having from one to seven carbon atoms and in which $R^4$ is an aliphatic radical having from 8 to 18 carbon atoms, is very satisfactory. An example is trimethyl-ammonium-dodecyl-chloride. One of $R'$, $R^2$ or $R^3$ may be an aromatic radical. An example of the latter is alkyl-dimethyl-benzyl-ammonium-chloride.

The following may be set out as specific examples of such quaternary ammonium compounds having the desired germicidal value: dimethyl-decyl-benzyl-ammoniumchloride, diethyl-dodecyl-benzyl-ammoniumbromide, trimethyl-dodecyl-ammoniumbromide, allyl-dibutyl-dodecylammoniumbromide, methyl-diallyl-dodecylammoniumiodide, diethyl-acetonyl-dodecylammoniumchloride, triethyl-dodecyloxymethylammonium chloride, dibenzyl-hydroxyethyl-dodecyloxymethyl-ammoniumchloride, diethyl-(β-hydroxy-γ-butyloxypropyl)-dodecyloxymethylammoniumchloride, diethyl-benzylthioethylglycidoammoniumchloride, diethyl-dodecyl-geranylthioethylammoniumbromide, diethyl-benzyl-dodecyl-thioethyl-ammoniumchloride, diethyl-benzyl-geranylammoniumchloride, dibutyl-allyl-dodecyloxymethyl-ammoniumchloride, dimethyl-geranyldodecyl-ammoniumchloride, dimethyl-nitrobenzyl-dodecyl-ammoniumchloride, diethyl-cyclohexyl-dodecyloxymethyl-ammoniumchloride, trihydroxyethyl-dodecyl ammoniumbromide, diethyl-benzyl-(γ-dodecyloxy-β-hydroxypropyl)-ammoniumchloride, trimethyldodecylammoniumrhodanide, dimethyl-benzyl-dodecylammoniumcyanide, dimethyl-tridecyl-benzylammoniumchloride, diethyl-pentadecyl-benzylammoniumbromide, dipropyl-phenylethyl-dodecyl-ammoniumbromide.

Sodium carbonate may be used in any suitable form. It may be added as the usual washing soda or it may be employed as an acid sodium carbonate (sodium bicarbonate).

The trisodium phosphate is regarded as an essential component of the composition by reason of its ability to emulsify fat and to keep the polyphosphate stable.

All those polyphosphates which contain the pyro radical will serve in my invention. I have found tetra sodium pyrophosphate to be particularly useful. Polyphosphates other than the pyrophosphates, such as hexametaphosphate and sodium tetraphosphate, which are commonly used as water softeners, will, for some reason, produce a precipitate with the quaternary ammonium compound irrespective of the presence of sodium carbonate, and therefore are not adaptable for use in my invention.

The various ingredients may be combined in a number of proportions, but I have found that the proportions set out below are highly desirable:

1–3 parts quaternary ammonium compound
5–50 parts sodium carbonate
2–15 parts trisodium phosphate
3–30 parts tetrasodium pyrophosphate When the composition is to be used, the above material compounded in the above proportions is mixed with sufficient water to make 1,000 parts. The product is readily water-soluble and becomes immediately effective as a detergent and bactericide.

The following specific examples may be set out:

*Example 1*

To one gram of "tallow" amine was added 4.5 gm. of sodium carbonate, 5.0 gm. tetrasodium pyrophosphate, and 5.0 gm. trisodium phosphate. Tallow amine is a mixture of trimethyl alkyl ammonium chloride. The alkyl group is derived from the following acids: approximately 3% myristic acid, 29% palmitic acid, 18.5% stearic acid, 46.5% oleic acid, 3.0% linoleic acid, and 0.0% linolenic acid.

The above mixture of substances was diluted to 1,000 parts with water to produce a clear solution.

*Example 2*

To one gram of "soya" amine was added 4.5 gm. of sodium carbonate, 5.0 gm. tetrasodium pyrophosphate, and 5.0 gm. trisodium phosphate. Soya amine is a mixture of trimethyl alkyl ammonium chloride. The alkyl groups are derived from the following acids: approximately 0.0% myristic acid, 6.5% palmitic acid, 4.5% stearic acid, 43.5% oleic acid, 52.5% linoleic acid, and 2.3% linolenic acid.

The above mixture of substances was diluted to 1,000 parts with water to produce a clear solution.

*Example 3*

To one gram of alkyl dimethyl benzyl ammonium chloride was added 4.5 gm. sodium carbonate, 5.0 gm. tetrasodium pyrophosphate, and 5 gm. trisodium phosphate. This mixture of substances was diluted to 1,000 parts with water to produce a clear solution.

*Example 4*

To one gram of "tallow" amine was added 4.5 gm. sodium carbonate, 5 gm. sodium pyrophosphate, and 5 gm. trisodium phosphate. This mixture was diluted to 1,000 parts with water to produce a clear solution.

The new germicidal detergent is unusually effective for the cleaning of plant equipment and other fat-containing structures and is useful in any part of the country with any type of water. The compound has unusual penetrating power and is highly effective as a bactericide. It is found that a single washing step is sufficient to remove the fat and other foreign material while at the same time leaving the equipment sterile.

While in the foregoing specification, I have set forth certain details in extenso for the purpose of illustrating completely an embodiment of the invention, it will be understood that such details may be varied widely by those skilled in the art without departing from the spirit of my invention.

I claim:

1. A germicidal detergent composition which provides a clear solution when diluted to 1,000 parts with water, comprising trisodium phosphate, tetrasodium pyrophosphate, a water-soluble quaternary ammonium halide having germicidal properties, and sodium carbonate, the proportions by weight being from 1 to 3 parts of the quaternary ammonium compound, from 5 to 50 parts of sodium carbonate, from 2 to 15 parts of trisodium phosphate, and from 3 to 30 parts of the pyrophosphate.

2. A germicidal detergent composition which provides a clear solution when diluted to 1,000 parts with water, comprising trisodium phosphate, tetrasodium pyrophosphate, sodium carbonate, and a water soluble trimethyl alkyl ammonium chloride in which the alkyl group is an aliphatic radical having from 8 to 18 carbon atoms, the proportions by weight being from 1 to 3 parts of the trimethyl alkyl ammonium compound, from 5 to 50 parts of sodium carbonate, from 2 to 15 parts of trisodium phosphate, and from 3 to 30 parts of the pyrophosphate.

3. A germicidal detergent composition which provides a clear solution when diluted to 1,000 parts with water, comprising by weight about 5 parts trisodium phosphate, 5 parts tetrasodium pyrophosphate, 4½ parts sodium carbonate, and one part trimethyl alkyl ammonium chloride in which the alkyl group is an aliphatic radical having from 8 to 18 carbon atoms.

MELVIN WAYNE MARCOUX.

References Cited in the file of this patent

UNITED STATES PATENTS

| Number | Name | Date |
|---|---|---|
| 2,108,765 | Domagk | Feb. 15, 1938 |
| 2,365,215 | Rhodes | Dec. 19, 1944 |
| 2,406,902 | Rawlins | Sept. 3, 1946 |
| 2,435,453 | MacMahon | Feb. 3, 1948 |
| 2,444,836 | MacMahon | July 6, 1948 |
| 2,444,837 | MacMahon | July 6, 1948 |
| 2,519,747 | Du Bois | Aug. 22, 1950 |
| 2,519,841 | MacMahon | Aug. 22, 1950 |

FOREIGN PATENTS

| Number | Country | Date |
|---|---|---|
| 505,429 | Great Britain | 1939 |

OTHER REFERENCES

Chemical Formulary, Bennett, vol. 6 (1943), pp. 478 and 479.